March 20, 1956 D. L. ROWLAND 2,739,010
AUTOMOBILE LICENSE PLATE AND FUEL TANK FILLER SPOUT ARRANGEMENT
Filed Dec. 1, 1955 4 Sheets-Sheet 1

INVENTOR.
DAVID L. ROWLAND
BY
ATTORNEY

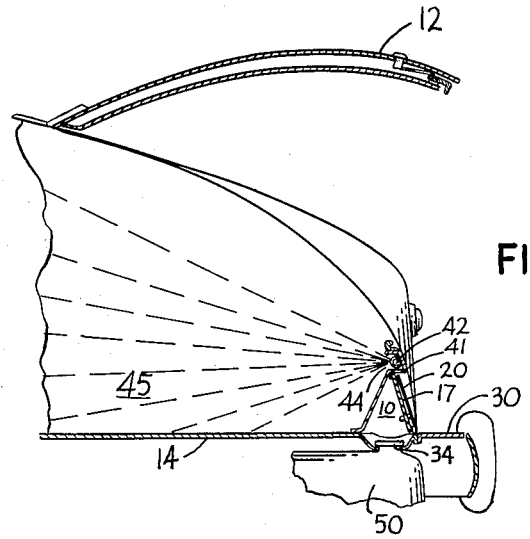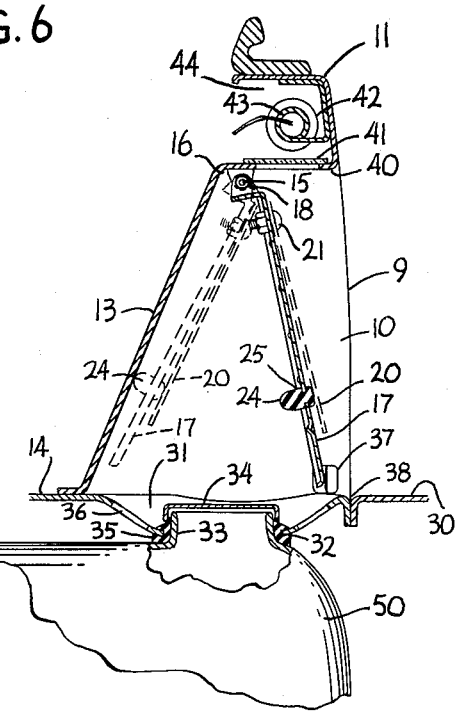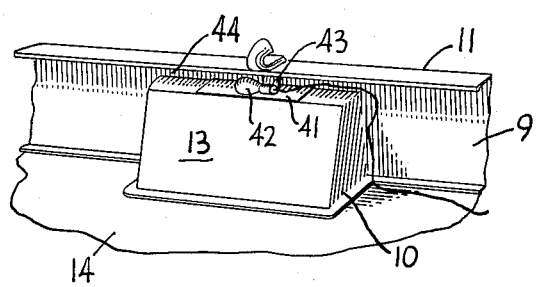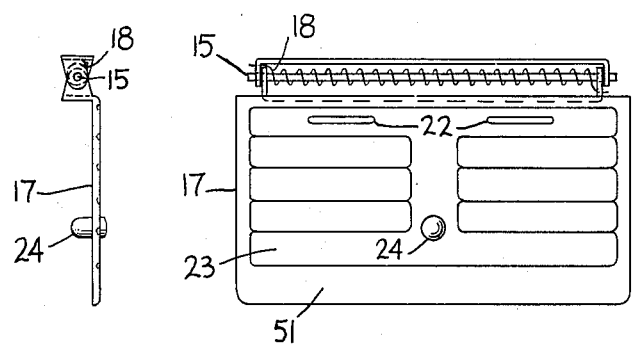

March 20, 1956     D. L. ROWLAND     2,739,010
AUTOMOBILE LICENSE PLATE AND FUEL TANK FILLER SPOUT ARRANGEMENT
Filed Dec. 1, 1955     4 Sheets-Sheet 3

INVENTOR.
DAVID L. ROWLAND
BY
ATTORNEY

March 20, 1956     D. L. ROWLAND     2,739,010
AUTOMOBILE LICENSE PLATE AND FUEL TANK FILLER SPOUT ARRANGEMENT
Filed Dec. 1, 1955
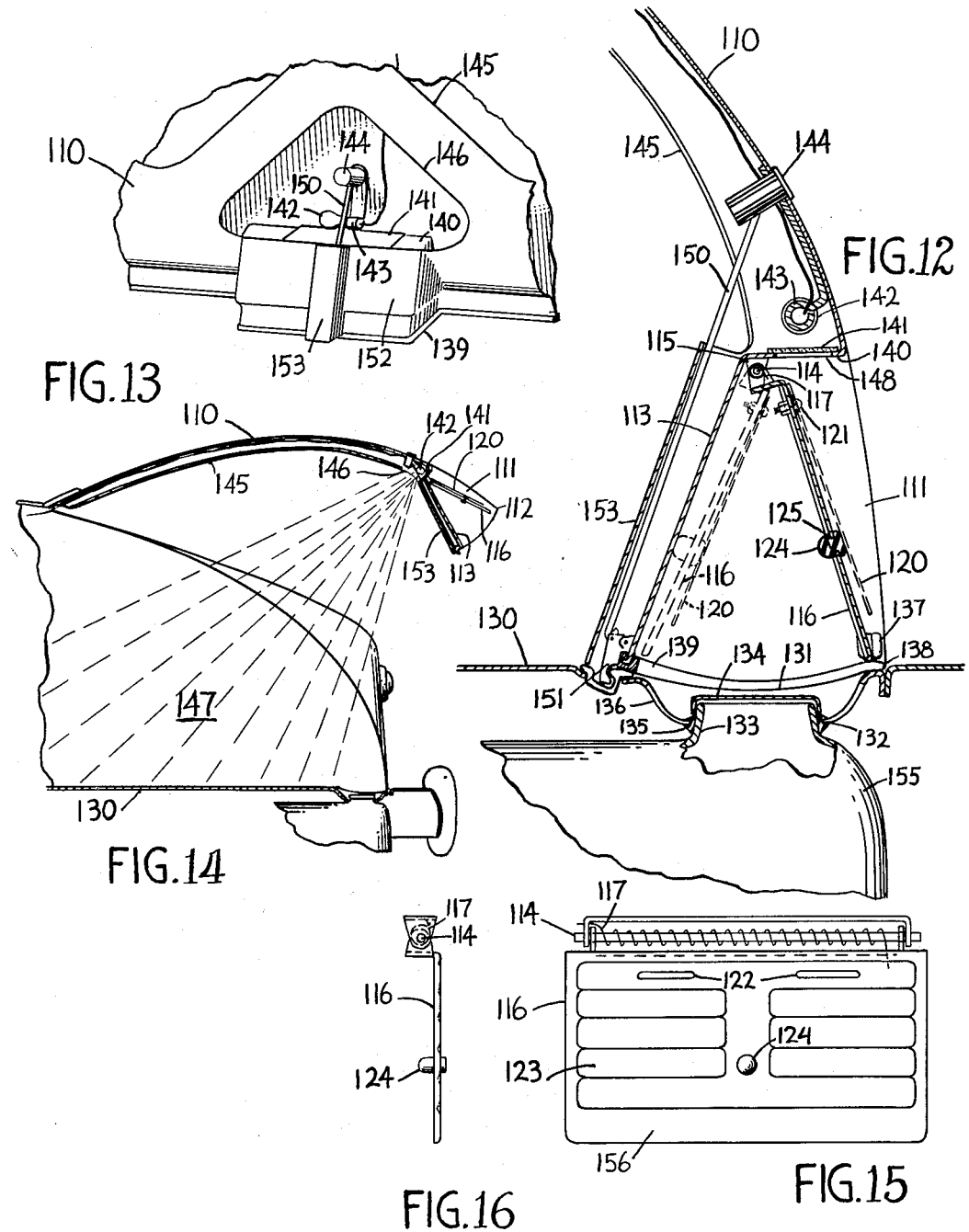
INVENTOR.
DAVID L. ROWLAND

United States Patent Office 2,739,010
Patented Mar. 20, 1956

2,739,010

AUTOMOBILE LICENSE PLATE AND FUEL TANK FILLER SPOUT ARRANGEMENT

David L. Rowland, New York, N. Y.

Application December 1, 1955, Serial No. 550,965

17 Claims. (Cl. 296—1)

This invention relates to improvements to the rear end of automobile bodies. More particularly, it relates to a unitary combination involving portions of the luggage compartment and lid, the gasoline tank, and the rear license plate, with related parts. This application is a continuation of my applications Serial Numbers 288,619 and 288,620, both filed May 19, 1952, and now abandoned both consolidated herein without additional disclosure.

One object of the invention is to provide a more economical, more efficient and better appearing automobile body by solving several important problems that have long confronted automobile manufacturers.

Another object of the invention is to solve many problems relating to the gasoline tank filling spout. Some of these arose due to the location of the gasoline cap at the side of the car, which has been inconvenient during filling, has added to manufacturing expense, has occupied space otherwise available inside the luggage compartment, has required a long pipe to conduct the gasoline into the tank, and has caused trapping of air by gasoline during filling. The side location also exposed the cap as an unsightly projection unless the manufacturer provided a small door to cover a sunken gasoline cap, further adding to the cost. Locating the cap in the center below the luggage compartment has not heretofore solved these problems, partly because the rear license plate had to be swung down about horizontal pivots before the filling station attendant could remove the cap and put the hose nozzle in the spout. Also, although the pipe might be somewhat shorter than when the gas cap was on the side of the car, it was still too long, adding to cost and causing gasoline to bubble back when air was trapped therein.

My invention achieves the above object by providing a new relation between the gasoline tank filling spout, the license plate, and the rear end of the car. My new structure overcomes the objections to a center location and does away with unsightly projections for the gas cap spout, expensive doors therefor, and with long pipes leading into the gas tank. At the same time, provision has been made for an overflow drain for getting rid of any gasoline that may spill and preventing its flow across the exterior finish of the body.

Another object is to solve the problem of how to mount the license plate, by incorporating the license plate into the body design and by placing it on or below the luggage compartment lid. The trunk floor may therefore be on the same level as the bumper, or it may be above it. My invention makes it possible to eliminate the panel that projects above the bumper and beneath the luggage compartment lid, and the license plate is completely out of the way when the trunk is being loaded, or to leave the panel and locate the license plate in it. My invention also obviates such accessories as license plate brackets and frames by providing a recess in the rear body panel or lid and a built-in mounting member to accommodate the license plate. In my novel mounting the license plate covers the gas tank cap during normal operation and is pushed back by the filling hose when the gas tank is being filled. The filling station attendant need not even touch the license plate with his hands prior to or while filling the tank.

Another object is to achieve proper lighting arrangements on the rear end of the automobile in addition to the taillight, which is not concerned in this invention. My invention provides a light for the license plate, the gasoline filler opening, and the interior of the luggage compartment. The filling station attendant can now see the gas tank cap or the filler tube and can observe the gasoline level and prevent spilling without holding a flashlight in his hand. Also, a single light bulb can illuminate the license plate while the car is being driven, illuminate the gas tank cap and opening while the gas tank is being filled, and illuminate the interior of the trunk whenever the trunk lid is raised. The present invention accomplishes these three functions by a novel combination of the rear end body elements.

Another object of the invention is to prevent the license plate light from being obscured by snow, and also to protect the gas tank cap from snow. I do this by providing along the lower edge of the trunk lid or in the body panel below the lid, a recessed portion that accommodates the license plate. The license plate itself is held by a support plate pivotally mounted along and near the upper edge of the recess, so that it can be swung back into the recessed area. When the plate is pushed back into the recess, the gas cap is exposed, the luggage compartment floor being recessed in an area adjacent the recess to accommodate the gasoline cap. The cap can be directly attached to the tank or to a small projection therefrom. A spring normally urges the license plate to its outer position. Above the license plate, a light bulb is mounted so as to shine down on the license plate, or on the gas tank filler opening when the license is pushed out of the way. Whenever the trunk lid is raised, the light bulb will illuminate the interior of the trunk.

Other objects and advantages of the invention will appear from the following description of preferred forms thereof given as illustrative examples in accordance with 35 U. S. C. 112. Changes may, of course, be made in the size, shape and (to some extent) the location of the parts without departing from the scope of this invention, as indicated in the appended claims.

In the drawings:

Fig. 4 is a view in side elevation and in section taken generally along the line 4—4 in Fig. 2. The position of the license plate is indicated by dotted lines, and the alternative position of the license plate and its holder when they are in their recessed position is also indicated in dotted lines.

Fig. 5 is a fragmentary view in perspective of the interior of the body in the vicinity of the license plate recess.

Fig. 6 is a view in section taken generally along the position indicated by the line 6—6 in Fig. 1 but with the trunk lid raised. This view shows how the light for the license plate illuminates the interior of the trunk, the broken lines being used to indicate the paths of some of the light rays.

Fig. 7 is a view in elevation of the license holder or support plate.

Fig. 8 is a view in side elevation of the license plate holder of Fig. 7.

Fig. 12 is a view in side elevation and in section taken generally along the line 12—12 in Fig. 10. The position of the license plate is indicated by dotted lines, and the alternative position of the license plate and its holder when they are in their recessed position is also indicated in dotted lines.

Fig. 13 is a fragmentary view in perspective of the interior of the modified trunk lid in the vicinity of the trunk lock and the license plate recess.

Fig. 14 is a view in section taken generally along the position indicated by the line 14—14 in Fig. 9 but with the trunk lid raised. This view shows how the light for the license plate illuminates the interior of the trunk, the broken lines being used to indicate the paths of some of the light rays.

Fig. 15 is a view in elevation of the license holder or support plate.

Fig. 16 is a view in side elevation of the license plate holder of Fig. 15.

Figure 1:
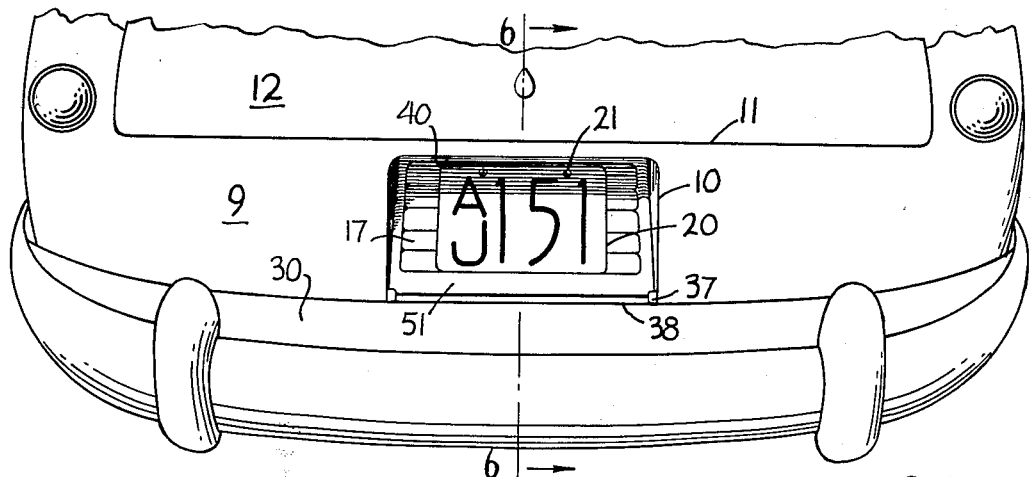
Fig. 1 is a view in perspective of a portion of the rear end of an automobile embodying the principles of this invention.
Figure 2:
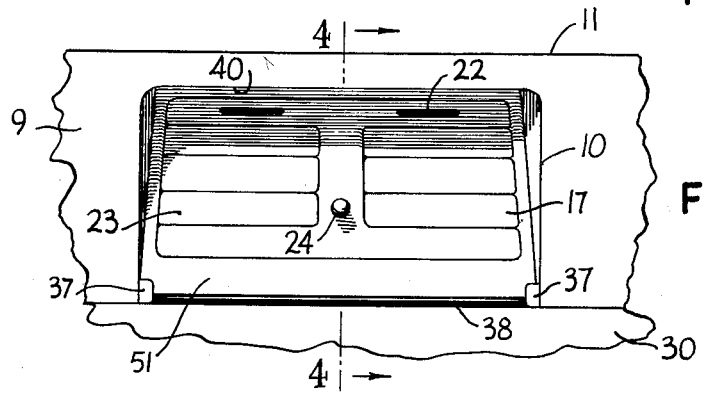
Fig. 2 is an enlarged view of a portion of Fig. 1 with the license plate itself removed from the license plate holder or support plate.
Figure 3:
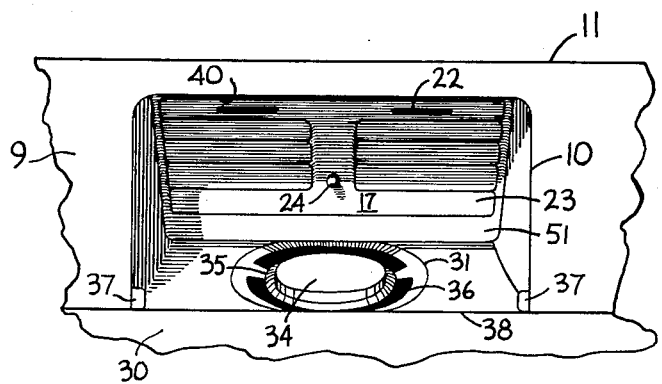
Fig. 3 is a view similar to Fig. 2 showing the license plate holder pushed back out of the way to expose the gas tank filling opening and cap. The license plate is shown removed in this view but, if it were in place, it would be only a fraction of an inch in front of the license holder.

In the form of the invention shown in Figs. 1–8, the automobile lower rear body panel 9 is provided with a recessed area 10 near to and below the edge 11 where the trunk lid 12 closes against the body 9. The body 9 may be formed with the recess 10 stamped into it so that the rear wall 13 of the recess 10 is an integral part thereof, or a separate piece of metal of the correct size and shape may be fitted into this recess and secured to the luggage compartment floor 14, as by welding or by bolts. A rod 15 may be mounted horizontally across the recess 10 near the rear and upper corner 16 thereof, and a license holder or support 17 may be rotatably mounted on the rod 15. A spring 18 (see Fig. 7) is preferably provided for urging the holder 17 normally to the position shown in Fig. 2 and shown in solid lines in Fig. 4. The exertion of a small amount of pressure can swing the holder 17 back into the position shown in Fig. 3 and shown in dotted lines in Fig. 4. If desired, the spring 18 may be covered by an extension of the holder 17, or the spring may be located behind the support 17 and the rear wall 13 of the recess 10.

A license plate 20 may be secured to the holder 17, as by bolts 21 that pass through the slits 22. Preferably, the recess 10 and the holder 17 are made large enough to accommodate the largest license plate used by any state in the United States, and the slits 22 will enable small or large license plates to be mounted thereon. In Fig. 1 a relatively small license plate 20 is shown, to indicate how the surface 23 of the holder 17 prevents the small license plate 20 from looking awkward. A small bumper 24 preferably of rubber or rubber-like material may be secured in an opening 25 in the center of the holder 17, and the license plate 20 may rest against this bumper 24. When the license plate 20 and holder 17 are swung back, the bumper 24 engages the rear wall 13 of the recess 10.

The portion of the luggage compartment floor 14 that lies outside the luggage compartment and in the recess 10 is practically level with the gravel plate 30 and may be provided with a recessed well 31 having a central hole 32 through which a gasoline neck, tank spout, or fitting 33 may project. Preferably the gas tank cap 34 lies just above the bottom of the well 31. A gasket 35 may be provided between the neck 33 and the well 31 to prevent rattling. In the bottom of the well 31 around the neck 33, I prefer to provide a plurality of drain openings 36 through which excess or spilled gasoline may flow.

Preferably one or more snubbers 37 are mounted on the floor 14 or the side walls of the recess 10 along the front edge 38 of the recess 10. The snubbers 37 help position the holder 17 by stopping the outward movement urged by the spring 18. Preferably the snubbers 37 are made from neoprene or other gasoline-resistant resilient material.

In the upper wall 40 of the recess 10 I prefer to provide a window 41 of glass or clear plastic. Above the window 41 a light bulb 42 is mounted in a bracket 43. The bracket 43 may be secured to the body 9 within the counter-recess 44 below the edge 11, as shown in Figs. 4 and 5. The bracket 43 is positioned so that the light will shine through the window 41 onto the license plate 20 when the license holder plate 17 is in the position indicated in Fig. 2 and will shine on the gas tank cap 34 or into the gas tank opening when the license plate holder 17 is in the position shown in Fig. 3. The light bulb 42 can also shine out from the counter-recess 44 and thereby illuminate the interior 45 of the trunk. When the trunk lid 12 is raised into the position shown in Fig. 6, the light will shine along the paths indicated by the diverging broken lines.

In operation the rear end of the automobile will, at most times, appear as shown in Fig. 1. In this position, when the automobile lights are turned on, the rear license plate 20 is illuminated by the light bulb 42 shining through the window 41. When the gas tank 50 is to be filled with gasoline, the license plate 20 and its holder 17 are simply swung back into the recess 10, exposing the gas tank cap 34 which may then be removed. During the time that the license plate 20 is being swung from one position to the other, the rubber bumper 24 positions it properly and the spring 18 forces it back into place when it is released, the snubbers 37 stopping it at the proper location. At night the light will aid in the removal of the cap 34 by illuminating it. The filling station nozzle may then be inserted into the gas tank 50, and at night the light will enable the attendant to tell when the tank 50 is getting full. There will be no bubbling or air trapping, because the gas tank nozzle extends into the gas tank 50 itself. If the service station operator should make a mistake and not cut off the flow of gasoline soon enough, the excess gasoline will flow away through the drain openings 36, so that no gasoline is spilled over the outside finish of the car.

When the trunk lid 13 is raised, the fact that the light shines out from the counter-recess 44 enables it to illuminate the interior 45 of the trunk, the light rays appearing as shown in Fig. 6.

The attractive appearance of an automobile rear end made in accordance with this invention is an important feature thereof, and it will be noticed that the license plate 20 has a framed appearance no matter what size the plate is. Also, the name of the dealer, the city of the owner, and other such features which are often put on license plate frames, may be placed on the bottom margin 51 of the license plate holder 16 without cluttering the appearance.

This invention is suitable for use not only with automobiles having luggage compartments but also with station wagons, sedan delivery trucks, and panel trucks.

In the form of the invention shown in Figs. 9–16, the trunk or luggage compartment lid 110 is provided with a recessed area 111 at the center of its rear and lower edge 112. The trunk lid 110 may be formed with the recess 111 stamped into it so that the rear wall 113 of the recess 111 is an integral part of the luggage lid 110, or a separate piece of metal of the correct size and shape may be fitted into this recess and secured to the trunk lid 110, as by welding or by bolts. A rod 114 may be mounted horizontally across the recess 111 near the rear and upper corner 115 thereof, and a license holder or support 116 may be rotatably mounted on the rod 114. A spring 117 (see Fig. 15) is preferably provided for urging the holder 116 normally to the position shown in Fig. 10 and shown in solid lines in Fig. 12. The exertion of a small amount of pressure can swing the holder 116 back into the position shown in Fig. 11 and shown in dotted lines in Fig. 12. If desired, the spring 117 may be covered by an extension of the support 116, or the spring may be located behind the support 116 and the rear wall 113 of the recess 111.

Figure 9:
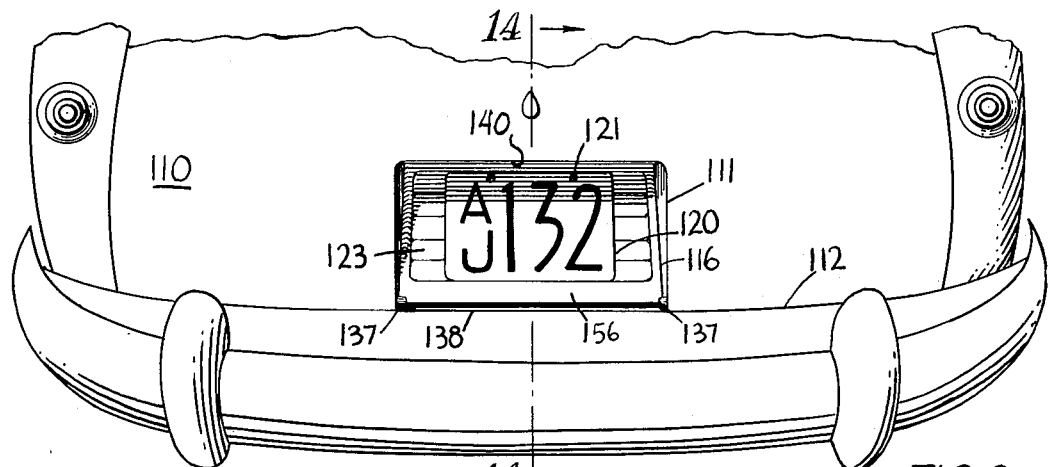
Fig. 9 is a view in perspective of a portion of the rear end of an automobile embodying a modified form of the invention.
Figure 10:
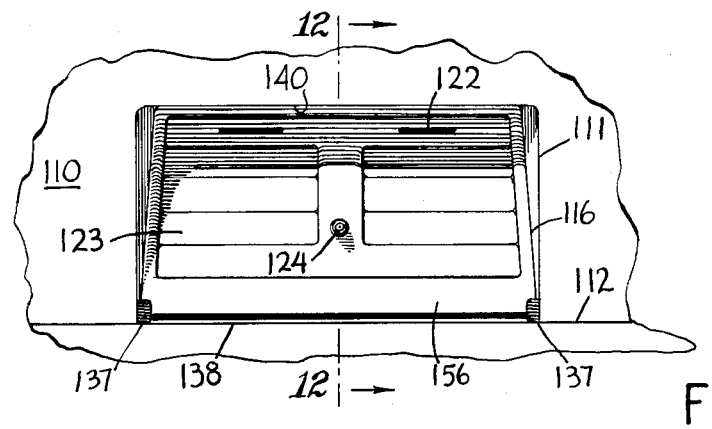
Fig. 10 is an enlarged view of a portion of Fig. 9 with the license plate itself removed from the license plate holder or support plate.
Figure 11:
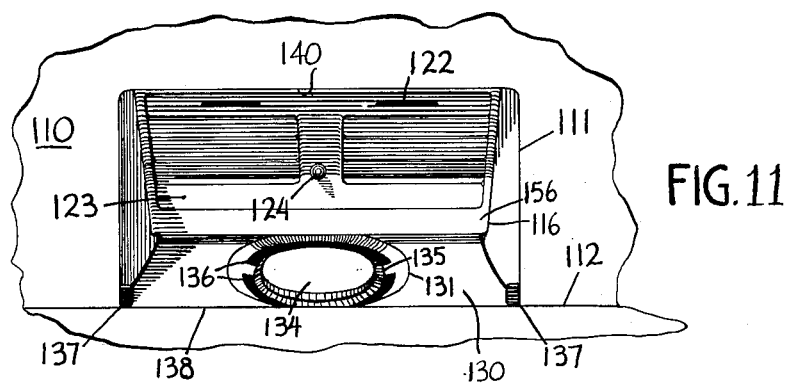
Fig. 11 is a view similar to Fig. 10 showing the license plate holder pushed back out of the way to expose the gas tank filling opening and cap. The license plate is shown removed in this view but, if it were in place, it would be only a fraction of an inch in front of the license holder.

A license plate 120 may be secured to the holder 116, as by bolts 121 that pass through the slits 122. Preferably, the recess 111 and the holder 116 are made large enough to accommodate the largest license plate used by any state in the United States, and the slits 122 will enable small or large license plates to be mounted thereon. In Fig. 9 a relatively small license plate 120 is shown, to indicate how the surface 123 of the holder 116 prevents the small license plate 120 from looking awkward. A small bumper 124 preferably of rubber or rubber-like material may be secured in an opening 125 in the center of the holder 116, and the license plate 120 may rest against this bumper 124. When the license plate 120 and holder 116 are swung back, the bumper 124 engages the rear wall 113 of the recess 111.

The luggage compartment floor 130 may be provided with a recessed well 131 having a central hole 132 through which a gasoline neck, tank spout, or fitting 133 may project. Preferably the gas tank cap 134 lies just above the bottom of the well 131. A gasket 135 may be provided between the neck 133 and the well 131 to prevent rattling. In the bottom of the well 131 around the neck 133, I prefer to provide a plurality of drain openings 136 through which excess or spilled gasoline may flow.

Preferably a pair of snubbers 137 are mounted on the side walls of the recess 111 along the front edge 138 of the recess 111. The snubbers 137 help position the holder 116 by stopping the outward movement urged by the spring 117. Preferably these snubbers 137 are made from neoprene or other gasoline-resistant rubber-like material. Similarly, there is preferably a gasket 139 of similar material along the lower edge of the rear wall 113 and the side of the recess 111 engaging the floor 130 to prevent gasoline or rain water or dust from penetrating into the luggage compartment and damaging the contents.

In the upper wall 140 of the recess 111 I prefer to provide a window 141 of glass or clear plastic. Above the window 141 a light bulb 142 is mounted in a bracket 143. The bracket 143 may be secured to the trunk lid 110 or it may be attached to the trunk lock 144 as shown in Figs. 12 and 13. The bracket 143 is positioned so that the light will shine through the window 141 onto the license plate 120 when the license holder plate 116 is in the position indicated in Fig. 10 and will shine on the gas tank cap 134 or into the gas tank opening when the license plate holder 116 is in the position shown in Fig. 11. The interior bracing member 145 of the trunk lid 110 may be provided with an opening 146 through which the light bulb 142 can shine and thereby illuminate the interior 147 of the trunk. When the trunk lid 110 is raised into the position shown in Fig. 14 the light will shine along the paths indicated by the diverging broken lines.

The recess 111 also may serve as a handle for the trunk lid 110. In this instance all that need be done to lift the unlocked trunk is to place the hand into the opening 148 beneath the window 141 and pull up. However, if desired, a separate handle (not shown) may be provided.

As is shown in the drawings, the trunk lock 144 may be located above the recessed area 111 with a latch release member 150 of conventional construction extending down to and operating a latch 151. The bracing member 145 is preferably recessed at 152 and again at 153, first, to follow the recess 111 and then to surround and protect the trunk latch release member 150.

In operation the rear end of the automobile will, at most times, appear as shown in Fig. 9. In this position, when the automobile lights are turned on, the rear license plate 120 is illuminated by the light bulb 142 shining through the window 141. When the gas tank 155 is to be filled with gasoline, the license plate 120 and its holder 116 are simply swung back into the recess 111, exposing the gas tank cap 134 which may then be removed. During the time that the license plate 120 is being swung from one position to the other, the rubber bumper 124 positions it properly and the spring 117 forces it back into place when it is released, the snubbers 137 stopping it at the proper location. At night the light will aid in the removal of the cap 134 by illuminating it. The filling station nozzle may then be inserted into the gas tank 155, and at night the light will enable the attendant to tell when the tank 155 is getting full. There will be no bubbling or air trapping, because the gas tank nozzle extends into the gas tank 155 itself. If the service station operator should make a mistake and not cut off the flow of gasoline soon enough, the excess gasoline will flow away through the drain openings 136, so that no gasoline is spilled over the outside finish of the car.

When the trunk lid 110 is raised, the light will shine through the opening 146 into the interior 147 of the trunk, the light rays appearing as shown in Fig. 14.

The attractive appearance of an automobile rear end made in accordance with this form of the invention is also an important feature thereof, and it will be noticed that the license plate 120 has a framed appearance no matter what size the plate is. Also, the name of the dealer, the city of the owner, and other such features which are often put on license plate frames, may be placed on the bottom margin 156 of the license plate holder 116 without cluttering the appearance.

I claim:

1. In combination with the rear end of an automobile body having a bumper and a luggage compartment: a rear body panel whose outer surface is provided with an inset recess at its central portion, said recess extending back substantially parallel to the longitudinal axis of the automobile and having an inner wall inclined downwardly toward the front of the automobile, two side walls, and an upper horizontal wall; a floor for said recess substantially level with the upper edge of said bumper and having a depressed portion directly under said recess; a gasoline tank below said floor with a covered spout projecting up through said floor depression, the cover for said spout being below the level of the undepressed portion of said floor, drain openings being provided through said floor depression around said spout for draining excess gasoline away therefrom; a horizontal rod extending across said recess between the two side walls thereof near the upper and inner corner thereof; a license plate holder in said recess pivotally mounted on said rod adjacent its upper edge; a license plate mounted on said holder; a spring normally urging said holder outwardly away from said inner wall; a resilient bumper member extending through said holder and into contact with said license plate and out the other side of said holder for contacting said recess inner wall when said holder is pushed back in said recess; at least one resilient snubber on the outer open edge of said recess for engaging said holder and preventing it from being swung out by said spring beyond its normal position; a horizontal window in the upper horizontal wall of said recess; a light-bulb-supporting bracket secured to said body above said window; and a light bulb in said bracket for illumination of said license plate when the holder is in its normal position and for illuminating said gasoline tank spout when said holder is swung back, and for illuminating the interior of said luggage compartment when said compartment is open.

2. The combination of claim 1 wherein said rear body panel is a separate stationary member below a lid for said luggage compartment.

3. The combination of claim 1 wherein said rear body panel constitutes the lid for said luggage compartment.

4. In combination with the rear end of an automobile body having a luggage compartment with an opening and a lid therefor: an exterior body surface portion extending below the rear edge of said luggage compartment opening provided with an inset recess at its central portion, said recess extending back substantially parallel to the longitudinal axis of the automobile and having an inner wall inclined downwardly toward the front of the automobile and an upper horizontal wall; a floor for said recess substantially level with the upper edge of said bumper and having a depressed portion directly under said recess; a gasoline tank below said floor with a spout projecting up through said floor depression, drain openings being provided through said floor depression around said spout for draining excess gasoline away therefrom; a horizontal rod extending across said recess near and substantially parallel to the upper and inner edge of said recess; a license plate holder in said recess pivotally mounted on said rod adjacent its upper edge; a spring normally urging said holder outwardly away from said inner recess wall; a window in the upper horizontal wall of said recess; a light-bulb-supporting bracket secured inside said luggage compartment above said window; and a light bulb in said bracket for illumination of a license plate mounted on the holder when the holder is in its normal position, for illuminating said gasoline tank spout when said license plate holder is swung back, and for illuminating the interior of the luggage compartment when said lid is raised.

5. In combination with the rear end of an automobile body having a bumper and a luggage compartment: a luggage compartment lid whose outer surface is provided with an inset recess at its central portion and along its lower edge, said recess extending back substantially parallel to the longitudinal axis of the automobile and having an inner wall inclined downwardly toward the front of the automobile and an upper horizontal wall; a luggage compartment floor substantially level with the upper edge of said bumper and having a depressed portion directly under said lid recess when said lid is closed; a gasoline tank below said floor with a spout projecting up through said floor depression, drain openings being provided through said floor depression around said spout for draining excess gasoline away therefrom; a horizontal rod extending across said recess near and substantially parallel to the upper and inner edge of said recess; a license plate holder in said recess pivotally mounted on said rod adjacent its upper edge; a spring normally urging said holder outwardly away from said inner recess wall; a window in the upper horizontal wall of said recess; a light-bulb-supporting bracket secured inside said trunk lid above said window; and a light bulb in said bracket for illumination of a license plate mounted on the holder when the holder is in its normal position, for illuminating said gasoline tank spout when said license plate holder is swung back, and for illuminating the interior of the luggage compartment when said lid is raised.

6. The combination of an automobile body rear end panel element provided with an inset recess at its central portion, said recess having an inner generally vertical wall and an upper horizontal wall; a floor for said recess having a depressed portion; a gasoline tank below said floor with a spout projecting up through said floor depression; a license plate holder pivotally mounted in said recess adjacent its upper edge; spring means normally urging said plate holder outwardly away from said inner wall; a window in the upper horizontal wall of said recess; a light-bulb-supporting bracket secured above said window; and a light bulb in said bracket.

7. The combination of claim 6 wherein said automobile body rear end is provided with a luggage compartment having a lid and wherein said panel element lies below said lid.

8. The combination of claim 6 wherein said automobile body panel element constitutes the lid for a luggage compartment.

9. The combination of an automobile having a rear bumper, a body rear end provided with an inset recess at its central portion, said recess having a rear wall and two side walls; a floor for said recess substantially level with the upper edge of said bumper and having a depressed portion; a gasoline tank below said floor with a covered spout projecting up through said floor depression with the cover lying below the level of the undepressed portion of said floor, drain openings being provided through said floor depression around said spout for draining excess gasoline away therefrom; a horizontal rod extending across said recess between the two side walls thereof and spaced downwardly from the upper edge thereof and near the rear wall; a license plate holder in said recess pivotally mounted on said rod adjacent its upper edge; a spring normally urging said plate holder away from said rear wall; a resilient bumper member on said plate holder for contacting said rear wall of said recess when said holder is pushed back in said recess; and resilient snubber means on the outer edge of said recess for engaging said holder and preventing it from being swung out by said spring beyond its normal position.

10. In combination with the rear end of an automobile body having a bumper and a luggage compartment: a luggage compartment lid whose outer surface is provided with an inset recess at its central portion and along its lower edge, said recess having a rear wall and two side walls; a luggage compartment floor substantially level with the upper edge of said bumper and having a depressed portion directly under said lid recess when said lid is closed; a gasoline tank below said floor with a covered spout projecting up through said floor depression with the cover lying below the level of the undepressed portion of said floor; drain openings being provided through said floor depression around said spout for draining excess gasoline away therefrom; a horizontal rod extending across said recess between the two side walls thereof and spaced downwardly from the upper edge thereof and near the rear wall; a license plate holder in said recess pivotally mounted on said rod adjacent its upper edge; a spring normally urging said plate holder away from said rear wall; a resilient bumper member on said plate holder for contacting said rear wall of said recess when said holder is pushed back in said recess; and resilient snubber means on the outer edge of said recess for engaging said holder and preventing it from being swung out by said spring beyond its normal position.

11. An automobile body including in combination a body member having a generally upright portion with an indentation therein, at its central portion; a fuel tank therebelow having a spout extending to a position accessible from said indentation; a license plate holder having its upper edge pivotally mounted in said indentation and its lower edge swingable about the pivot between a position between said spout and the inner portion of said indentation of said body member where said spout is exposed for filling said tank with fuel, and a position away from the inner portion of said indentation obscuring said spout; and yieldable means normally urging said holder to the latter position.

12. The body of claim 11 wherein said body member is stationary and wherein said body has a luggage compartment with an opening and a lid covering said opening, said stationary body member lying below said luggage compartment lid.

13. The body of claim 11 wherein said body member comprises a lid for a luggage compartment.

14. An automobile rear end having a body member with an indentation therein at its central portion, said indentation having an upper wall and an inner wall; a gasoline tank therebelow having a spout extending to an accessible position directly below said indentation; a license plate holder having its upper edge pivotally mounted in said indentation, and swingable about its pivot between an inner position adjacent said inner wall exposing said spout and an outer position away from said inner wall obscuring said spout; yieldable means normally urging said holder to said outer position; a window in the upper wall of said indentation; and a light bulb mounted above said window for illumination therethrough.

15. In combination with the rear end of an automobile body having a luggage compartment: a luggage compartment lid having an indentation therein at its central portion and along its lower edge providing an inset wall; a gasoline tank below said luggage compartment and having a spout extending to an accessible position directly below said indentation; a license plate holder having its upper edge pivotally mounted in said indentation, and normally urged to a position obscuring said spout, said holder being swingable about its pivot to be swung out of the way in past said spout toward said inset wall to gain access to said tank; a window in the upper edge of said indentation; and a light bulb mounted inside said trunk lid above said window for illumination therethrough.

16. In combination with the rear end of an automobile body having a luggage compartment: a luggage compartment lid having an indentation providing an inset wall therein at its central portion and along its lower edge; a gasoline tank below said luggage compartment and having a spout extending to an accessible position directly below said indentation; and a license plate holder having its upper edge pivotally mounted in said indentation, and normally urged to a position obscuring said spout, said holder being swingable about its pivot toward said inset wall so that it can be pivoted back out of the way to gain access to said tank.

17. In combination with the rear end of an automobile body having a luggage compartment: a lower rear body panel having a recess therein at its central portion spaced downwardly from its upper edge, said upper edge having an inwardly extending flange to provide a sheltered recessed portion on the interior of said luggage compartment, said sheltered portion having as its upper wall said inwardly extending flange and as its lower wall the upper wall of said recess, said walls extending generally parallel to each other and generally horizontally and free from obstructions between them into said luggage compartment; a license plate holder mounted in said recess; a window in the upper wall of said recess; and a light bulb mounted above said window in said sheltered interior recess for illumination downwards of a license plate mounted in said holder and for unobstructed illumination along the fore-and-aft line of the vehicle for lighting up the interior of said luggage compartment at the same time.

No references cited.